Patented Mar. 1, 1927.

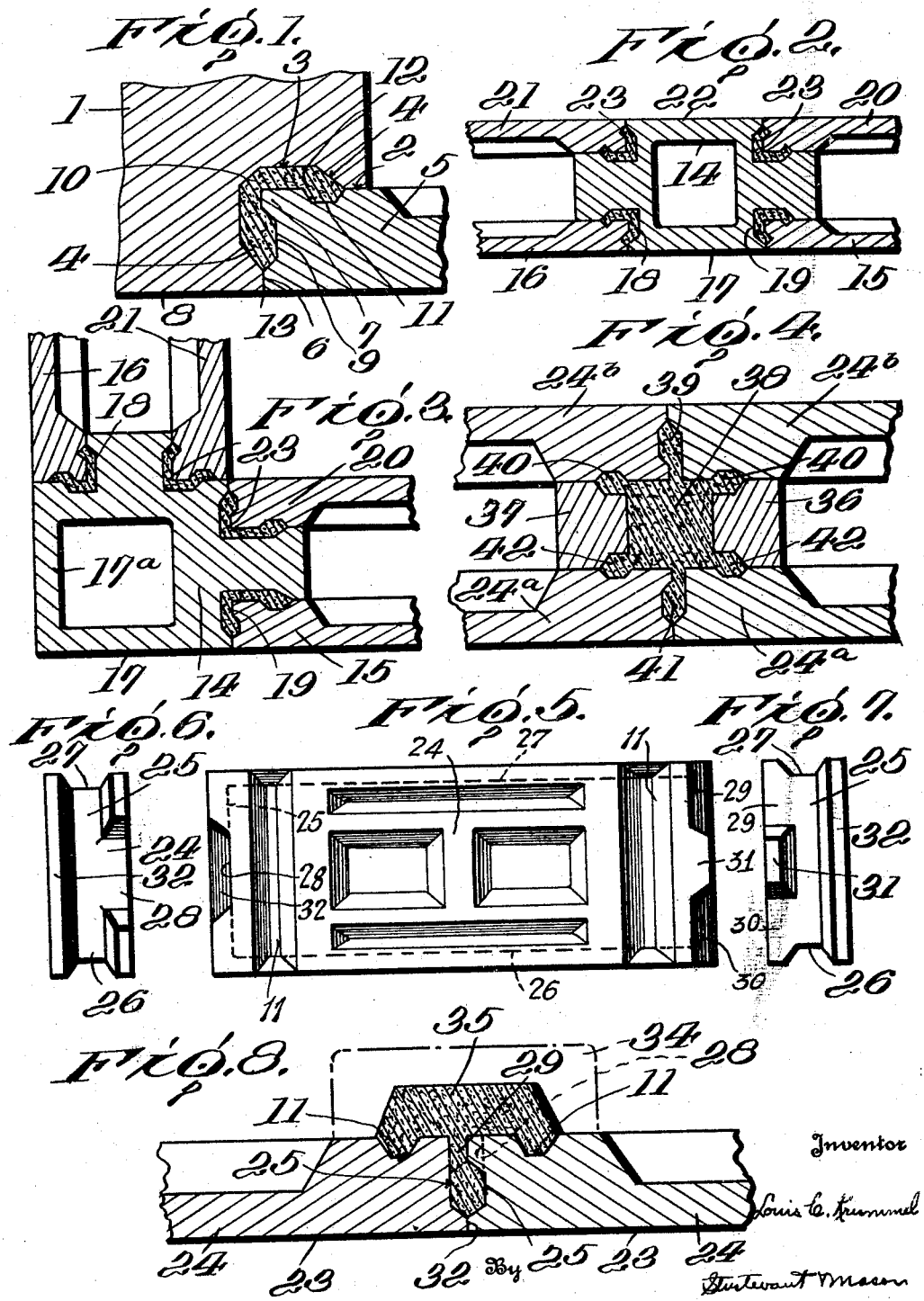

1,619,737

UNITED STATES PATENT OFFICE.

LOUIS CHARLES KRUMMEL, OF BROOKLYN, NEW YORK.

PRECAST PLASTIC COMPOSITION STRUCTURAL PARTS AND MEANS FOR UNITING THE SAME.

Application filed April 1, 1926. Serial No. 99,065.

The invention relates to new and useful improvements in structural parts made from plastic compositions, and the manner of uniting the same.

An object of the invention is to provide pre-cast structural parts made from plastic compositions which are united after set in place by poured keys formed from cement or the like, which parts are so constructed that the same are secured together structurally independent of the adhesive property of the poured key and plastic composition from which the parts are made.

A further object of the invention is to provide a structure of the above character wherein the pre-cast parts are so shaped that when the key is poured, the parts will be held from both lateral and longitudinal movements relative to each other.

These and other objects will in part be obvious and will in part be hereinafter more fully disclosed.

In the drawings—

Figure 1 is a horizontal sectional view showing the plate and the post constructed and united in accordance with my invention;

Fig. 2 is a horizontal sectional view showing spaced plates united to a post so as to form a wall structure;

Fig. 3 is a horizontal sectional view showing the plates united to a corner post and forming walls at right angles to each other;

Fig. 4 is a horizontal sectional view showing the plates joined end to end in accordance with my invention;

Fig. 5 is a rear face view of one of my improved plates;

Fig. 6 is a view of the left-hand end of said plate as seen in Fig. 5;

Fig. 7 is a view of the right-hand end thereof, and

Fig. 8 is a horizontal sectional view showing two plates united end to end.

The invention broadly consists in the shaping of the plates, slabs, and posts which are to be united in the forming of a structure, which parts are made from a plastic composition, such as concrete or the like. These parts, after being properly shaped, are united by keys formed by pouring cement into spaces which are provided therefor when the parts are properly set to be joined together. Plates or slabs may be joined to posts or may be joined end on in the carrying out of my invention. In either case, the end of the plate or slab and the side face of the post to which it is to be joined end on, are so constructed, that the key which is formed by the hardening of the poured cement holds the plate from movement away from the post or away from the companion plate or slab to which it is joined, and also holds the plate or slab from lateral movement relative to the plate to which it is joined. Thus it is that the parts are united in such a way that the adhesive property of the cement is not relied upon alone to join the parts, for the reason that the parts cannot be separated without actually shearing the cement key which joins them, or shearing parts of the plastic composition which is joined by the cement key. The pre-cast parts which are to be joined are preferably so constructed that this cement key formed by the pouring of the cement into the spaces formed therefor, not only extends part way across the end of the plate or slab, but also along the side face thereof, so that the key is interlocked with the end face of the plate or slab and also interlocked with the side face thereof.

Referring more in detail to the drawings, I have shown in Figures 1, 2 and 3 a construction of plate which can be joined to a vertical post by my improvements. The post is indicated at 1 and as shown in Fig. 1 of the drawings, it is provided with a corner recess 2 extending lengthwise of the post. This recess back from the side faces of the post is deepened so as to form an inset recess 3. The faces 4, 4 of this inset recess, which lead to the faces of the recess 2, are inclined to the face of the recess 2 at an obtuse angle. This is to avoid the undercutting and weakening of the side walls of the recess 2, such as is brought about when a dove-tailed recess is formed to aid in the joining of the parts. In Fig. 1, I have shown a plate 5 which is adapted to be connected to the post 1. This plate is of such a thickness that when the inner face thereof rests against the side face of the recess 2, the end 6 of the plate will rest against the other side face of the recess 2, and the front face 7 of the plate will be substantially flush with the front face 8 of the post. The parts can, of course, be cast with sufficient nicety, so that the side face of the plate will rest against the inner wall of the recess 2, and at the same time, have its outer wall flush with the front face of the post. In the end of the plate 5 there is a recess 9. This recess 9 is preferably shaped so as to terminate some distance back from the front face 7 of the plate. It preferably terminates at the same line that the wall 4 of the recess 3 terminates. It is also inclined so as to avoid any undercutting as is necessary in the forming of a dove-tailed groove. The inner edge of the recess 9 terminates at a distance back from the inner wall 10 of the plate 5 and is shaped similar to the front wall of the recess 9.

There is also a recess 11 in the rear face of the plate 5. This recess is shaped similar to the recess 9 and is so disposed that the right-hand side thereof terminates substantially at the same line where the wall 4 of the recess terminates.

In the joining of the structural parts shown in Fig. 1, the plate 5 is placed in the post 1 so that the rear face of the plate makes contact with the rear face of the recess 2 in the post 1. The end 6 of the plate 5 is preferably set so as to butt against the side face of the recess 2. With the parts thus placed, cement is poured so as to form a key 12. It is understood, of course, that any suitable material may be used instead of cement, but some material should be used, however, which can be poured into the chamber or pocket formed by the recesses 3, 9 and 11. If it is desired to have the seam 13 between the end wall 6 and the side face of the recess in the post 1, an open seam, this, of course, can be accomplished by separating these parts a reasonable distance and utilizing some means to prevent the cement substance from escaping through the seam when pouring the key 12. It will be noted from the above, that this key 12 extends across the end of the plate and also along the side face of the plate. In other words, it extends around the corner of the plate. When the slab is in place, the key prevents the slab from moving endwise by reason of the fact that it is interlocked with the slab at the recess 11, and the only way the slab can move endwise is by shearing off the key, for the reason that this solid key 12 projects to the rear of the side face 2 of the recess, and also projects in front of the rear face of the plate. The plate is likewise held from lateral movement by this key 12. The plate cannot move laterally without shearing off the key, as the key projects both into the end of the plate and also into the side face of the recess 2 in the post. When parts are joined by my improvement, they are not held together by the adhesive properties of the cement alone, although this, of course, aids in the joining of the parts, but the parts are so shaped that either a shearing of the key, or a shearing of the portion of the post, or a shearing of a portion of the plate must be effected before the parts can separate.

In Fig. 2 of the drawings, I have shown how my improved means for joining structural parts may be used for forming a hollow wall by the use of plates which are interchangeable. In this figure, the post is indicated at 14, and is preferably a hollow post. Plates 15 and 16 are secured to the post so as to be flush with the front face 17 thereof, by keys 18 and 19 which are formed after the manner described in detail in connection with Fig. 1. Plates 20 and 21 are also secured to the post, so that their rear faces are substantially flush with the rear face 22 of the post 14. These plates 20 and 21 are secured to the post by keys 23, 23 similar in construction to the key 12. The front and rear plates are separated from each other so as to form a hollow wall. It will be apparent that when a wall is built up after the manner shown in Fig. 2, that the side plates forming the wall are held from lateral movement relative to the post, and they are also held from endwise movement relative to the post. Such movements can only occur after either the key or the structural parts of the plate or post have been sheared off.

In Fig. 3 of the drawings, I have shown the walls positioned so as to form a structure wherein the walls are at right angles to each other and united to a corner post. The parts are similar in construction to those in Fig. 2, and have been so numbered. In this case, the plate 15 is, however, flush with the front face 17 of the post 14, while the front face of the plate 16 is flush with the side face 17ª of the post 14. Furthermore, the face of the plate 20 is at right angles to the face of the plate 21. The recesses 9 and 11 preferably extend all the way across the end and the side face of the plate. It will be understood that one plate may be set at the top of another plate, and thus a wall built up, and either closed seams or open seams may be formed between the plates. While I have described the attachment of plates set vertically or on edge relative to a post, it will be understood that the same method may be used for joining slabs to beams or the like.

In Figures 4 to 8, inclusive, I have shown various schemes for joining the plates end to end without any intermediate post. In the joining of the plates end to end, they are preferably constructed as shown in Figures 5 to 7. The plate 24 is provided with an end groove or recess 25 extending all the way across the same, which is similar to the recess 9 described above in connection with Fig. 1. These plates may also be provided with recesses 26 and 27 at the the upper and lower side edges of the plate. A cross recess 28 leads from the rear of the plate into the recess 25. While I have shown the cross recess 28 on the left-hand end of the plate as intersecting the recess 25 midway between the ends thereof, it may be otherwise disposed. At the right-hand end of said plate 24, I have shown two cross recesses 29 and 30 which lead to the vertical recess 25 across the end of the plate. This leaves a portion 31 which extends out so as to lie flush with the end 32 of the plate. The purpose of these cross recesses is to provide means whereby when the plates are joined end to end, they will be firmly held against any endwise movement relative to each other, or any sidewise movement relative thereto.

In Fig. 8 of the drawings, I have shown two plates 24, 24, placed end to end, with the front faces 33 thereof substantially flush. The end walls 32 of the plates abut each other and may be either tight together or slightly spaced after the manner described in connection with the structure in Fig. 1 of the drawings. A suitable mold 34 is used in the forming of the key for joining these two plates end to end. This mold is indicated in dotted lines in Fig. 8. The mold has a recess in the face thereof placed against the rear face of the plates, so that the key 35 can be poured. The section in Fig. 8 is centrally through the plate. The key, as clearly shown in this figure, fills the recesses 25 formed in the adjacent ends of the plates 24. The key will also fill the cross recess 29 in the left-hand plate 24, and will also fill the cross recess 28 in the right-hand plate 24. This recess is indicated in dotted lines for the reason that the section is taken above the recess 28 in the plate. In the rear face of the plate 24, there is a recess 11, similar to that above described. There is a recess at each end of the plate, and therefore, the key 35 will fill these recesses as well as the recesses 25, 28, 29 and 30. Thus it is that the key will lock these two plates against any endwise movement without either shearing the key or a portion of the material forming the plate. It will also lock these plates against lateral movement, due to the fact that the recesses 28, 29 and 30 only extend for a portion of the height of the plate so that the remaining end parts at the rear edge of the plate are interlocked with the key.

In Fig. 4 of the drawings, I have shown the plates joined end to end and spaced to form a hollow wall. The structure shown in this figure consists of four plates such as shown and described in connection with Figures 5 to 7. The wall really has no front face any more than the wall shown in Fig. 2, but for the sake of description, we will refer to the plates 24$^a$, 24$^a$ as forming the front face of the wall and 24$^b$, 24$^b$ as forming the rear face of the wall. Instead of using a mold such as described in connection with Fig. 8, for forming the key for joining these plates, I use a spacing block 36. This block is used to space the front plates from the rear plates, and also forms the mold for forming the key. This block 36 has an opening therethrough to permit the cement forming the key to run through from one side of the block to the other, and thus form a union between the portion of the key which joins the rear plates and the portion of the key which joins the front plates. In Fig. 4, the section is through the key where the opening extends across, and the broken lines indicate where the key terminates above the opening. The key formed by pouring the cement in the chamber or space formed by the recesses and the spacing blocks is indicated at 38. This key includes a part 39 which prevents the two plates 24$^b$, 24$^b$ from lateral movement relative to each other. It is also provided with the parts 40, 40, which tie together the plates 24$^b$, 24$^b$ and prevent said plates from endwise movements. If the plates cannot move laterally to each other, then they are interlocked by these parts 40, 40 so that they cannot move endwise relative to each other. The key likewise has a part 41 which prevents lateral movement of the plates 24$^a$, 24$^a$. The key likewise has parts 42, 42 which serve to lock or hold the plates 24$^a$, 24$^a$ from endwise movement relative to each other.

It is hardly thought necessary to describe further in detail my improvement. It will be understood, of course, that it may be used in many ways for joining pre-cast structural parts made of plastic compositions. The shaping of the recesses for forming the key which joins the parts may be greatly varied or changed. The essential feature of the invention consists in the so shaping of the recesses and arrangement of the same on surfaces at an angle to each other, that when the key is poured it will be placed relative to the parts so as to prevent any possible lateral movement of one part relative to the other, and also endwise movement of one part relative to the other, without a shearing of the key, or a shearing of the material forming the parts which are joined together. In other words, my improvement consists in a means of joining pre-cast structural parts where cement may be poured after the parts are placed for joining the same, and the adhesive property of the cement is not alone depended upon for joining the parts.

While I have described the plates in Figures 4 to 8, inclusive, as having cross recesses for the purpose of permitting a key to be formed which not only extends in between the ends of the plates, to unite the sides thereof for joining the plates, it will be understood that these plates may likewise be used in the structures described in Figures 1 to 3, inclusive. In this case, the cross recesses will merely enlarge the key which extends about the corner of the plate. These cross recesses are not necessary in the structure shown in these figures, but they can be used with this form of structure, and thereby one plate only used for all the different forms of the structures. In other words, the plates are universal, and may be used in connection with a joining post or without any post between the ends of plates.

It will be understood that while I have shown plates joined to a post and joined to each other, in certain ways, that many other ways may be provided for arranging the plates relative to the post and of the forming of the recess in the post for the plates. I have only illustrated such arrangements as seem to me to be necessary to illustrate the principle of my invention.

Having thus described the invention, what I claim as new and desire to secure by Letters-Patent, is:

1. A joint construction comprising adjacent parts formed from a plastic composition, one of which is in the form of a plate having the front and rear faces thereof adjacent the ends disposed in parallel planes, and the end walls disposed in planes substantially at right angles thereto, each of said parts having recesses in faces thereof disposed at an angle to each other, said recesses being associated and connected so as to form channels, and a cementitious holding key in said channel and extending into said recesses from one angular face to the other.

2. A joint construction comprising a post formed from a plastic composition and having a recess therein extending lengthwise of the post and forming faces substantially at right angles to each other, a plate having the front and rear faces thereof adjacent the end disposed in planes parallel to each other, and the end wall in a plane at substantially right angles to the plane of the face, said recess in the post being adapted to receive the end of the plate and with the plate substantially flush with the front of the post, said plate having a recess in the end thereof and in the side face thereof disposed within the recess in said post, said post having a recess back from the side face thereof which extends about the corner of the plate and joins the recesses in the end and side face of the plate, and a cementitious key located in said recesses and extending about the corner of the plate for joining the plate to the post, so that the plate is held from movement either laterally or endwise relative to the post.

3. A plate formed of a plastic composition for use in joint construction comprising a body portion having the front and rear faces thereof adjacent the ends disposed in parallel planes and the ends disposed in planes substantially at right angles to the plane of the face, each end of the plate having a recess, and the rear face of the plate having recesses adjacent to but spaced from the ends thereof, each of said recesses having their side walls inclined outwardly from the bottom of the recess to the face of the plate.

In testimony whereof, I affix my signature.

LOUIS CHARLES KRUMMEL.